April 26, 1932. L. J. HIGGINBOTHAM 1,855,964
UNIVERSAL CAMERA STAND
Filed June 27, 1930 5 Sheets-Sheet 3

L. J. Higginbotham, INVENTOR
BY Victor J. Evans
ATTORNEY

April 26, 1932.  L. J. HIGGINBOTHAM  1,855,964
UNIVERSAL CAMERA STAND
Filed June 27, 1930  5 Sheets-Sheet 4
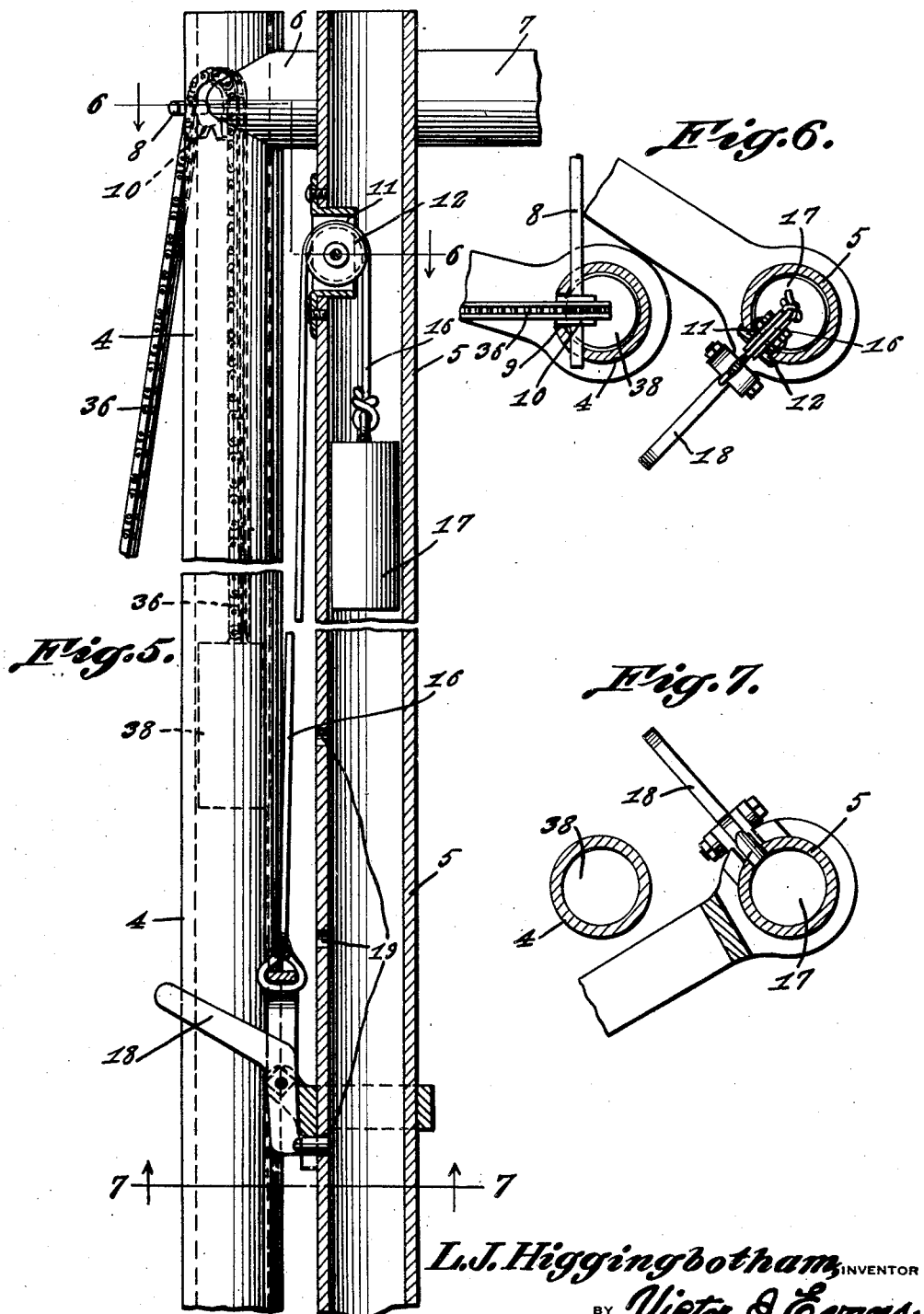
L. J. Higginbotham, INVENTOR
BY Victor J. Evans
ATTORNEY April 26, 1932.　　L. J. HIGGINBOTHAM　　1,855,964
UNIVERSAL CAMERA STAND
Filed June 27, 1930　　5 Sheets-Sheet 5

L. J. Higginbotham, INVENTOR
BY Victor J. Evans
ATTORNEY

Patented Apr. 26, 1932

1,855,964

UNITED STATES PATENT OFFICE

LUTHER JUDSON HIGGINBOTHAM, OF DALLAS, TEXAS

UNIVERSAL CAMERA STAND

Application filed June 27, 1930. Serial No. 464,316.

This invention relates to a camera stand, the general object of the invention being to provide means for supporting a camera in such a manner that the camera can be held in any desired position and angle and adjusted vertically from a low position to a high one.

Another object of the invention is to provide a platform for the cameraman which is also adjustable vertically so that the cameraman can adjust his platform in accordance with the position of the camera.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 5 is a view of a pair of the posts, with one post in section.

Figure 6 is a section on line 6—6 of Figure 5.

Figure 7 is a section on line 7—7 of Figure 5.

Figure 1:
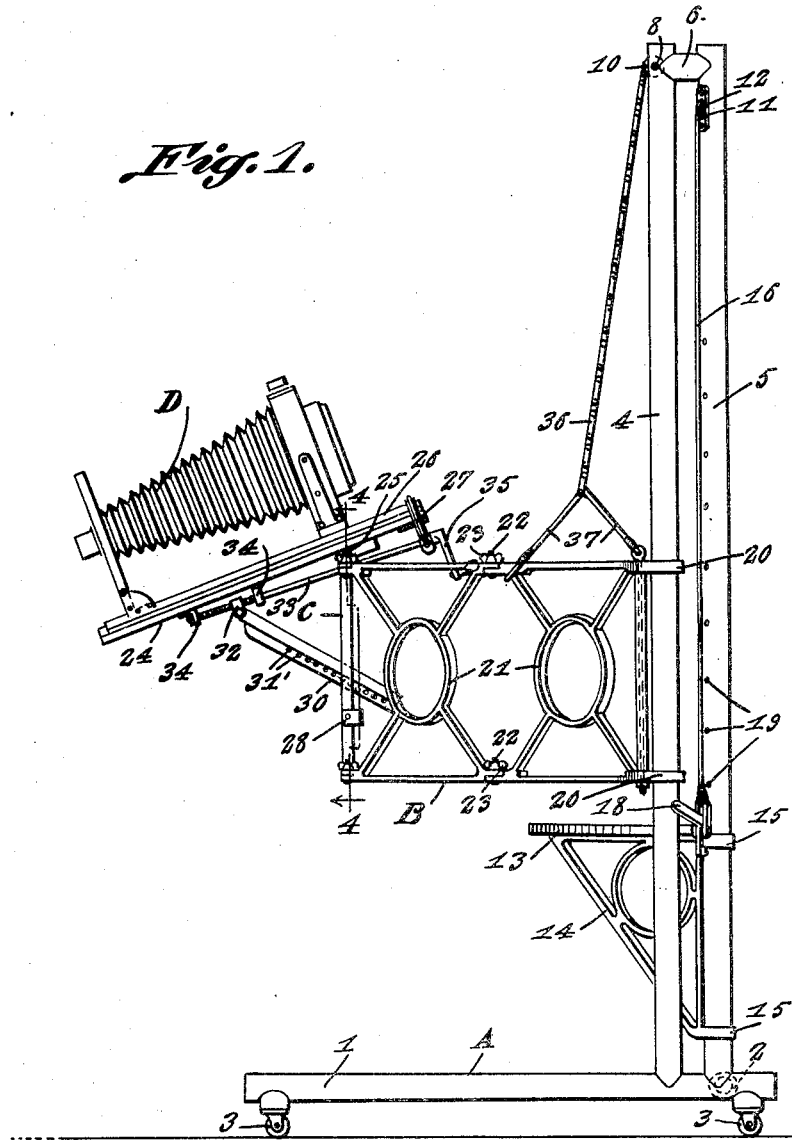
Figure 1 is an elevation of the device.

In these drawings, the letter A indicates a base, preferably formed of a pair of tubes 1, spaced apart and connected together adjacent their rear ends by the cross tube 2. Casters 3 are carried by the tubes 1. A pair of upright tubes 4 and 5 have their lower ends connected with the rear end of each tube 1, these tubes 4 and 5 being spaced apart and connected together at their upper ends by the short tube 6. The two rear tubes 5 have their upper ends connected together by the cross tube 7. A shaft 8 passes through the upper ends of the two front tubes 4, adjacent slots 9 formed in said tubes and this shaft carries the sprockets 10 which extend through the slots. The upper parts of the rear tubes 5 are also formed with the slots 11 and pulleys 12 are journaled in the said tubes and extend through the slots.

A platform 13 is supported by the side frames 14 and the rear part of each frame is provided with the collars 15 which encircle a rear tube 5 so that the platform and its frames can be moved vertically on the rear tubes. Cables 16 are connected with the platform frames and pass over the pulleys 12 into the tubes 5 where they are connected with the weights 17 in said tubes 5. These weights act as counterweights to the platform and a person standing on the same. A dog 18 is pivoted to each upper collar and said dog is adapted to engage any one of a vertical row of holes 19 formed in each tube 5 to hold the platform in adjusted position. These parts are so arranged that the dogs will automatically engage the holes unless they are held in inoperative position by their handles.

A sectional frame B is slidably and rotatably supported on each front tube or post 4 by having its collars 20 encircling the post. Each frame is composed of the two sections 21 pivotally connected together by the bolts 22 provided with the wing nuts 23 so that the sections can be fastened in adjusted position. The front sections are connected by bolts and wing nuts to a central frame C so that this central frame is pivotally connected to the sectional frames. An elongated plate-like member 24 is pivoted adjacent its rear end to the top of the central frame C, as shown at 25, so that said member can be tilted about a horizontal axis on said central frame. This member 24 forms a support for the base 26 of the camera D and said base can be clamped to the member, as shown at 27, or fastened thereto in any other suitable manner. A cross piece 28 of the central frame C is formed with the upstanding ears 29 and a bar 30 is pivotally connected with the ears by the pin 31. The bar is formed with a row of holes 31' and the pin is adapted to be passed through any one of these holes. A yoke 32 is pivoted to the upper end of the bar and is formed with a threaded hole to receive a threaded part of a shaft 33 which is rotatably supported by the hangers 34 attached to the member 24. A handle 35 is connected to the shaft.

Thus by adjusting the bar 30 by placing the pin 31 in the desired hole 31' in the bar, the supporting member 24 can be tilted on its axis to position the camera as desired. After this adjustment is made, the shaft 33 may be turned to secure a finer adjustment.

Chains 36 are attached to the rear sections of the frames B by the links 37 and these chains pass over the sprockets 10 into the posts or tubes 4, where they are attached to the weights 38 in said tubes. These weights act as counter weights for the camera and its supporting means and facilitate adjustments of the same.

Thus it will be seen that the camera supporting means can be adjusted vertically on the posts and that the operator on the platform can also adjust the platform vertically to accord with the position of the camera.

Figure 2:
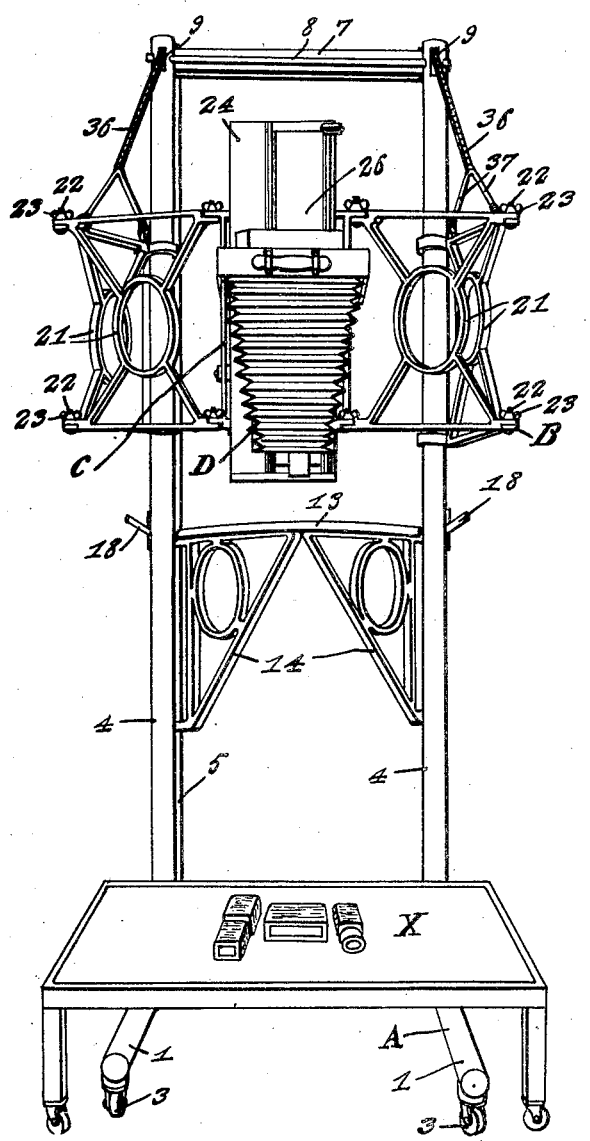
Figure 2 is a front view thereof.
Figure 3:
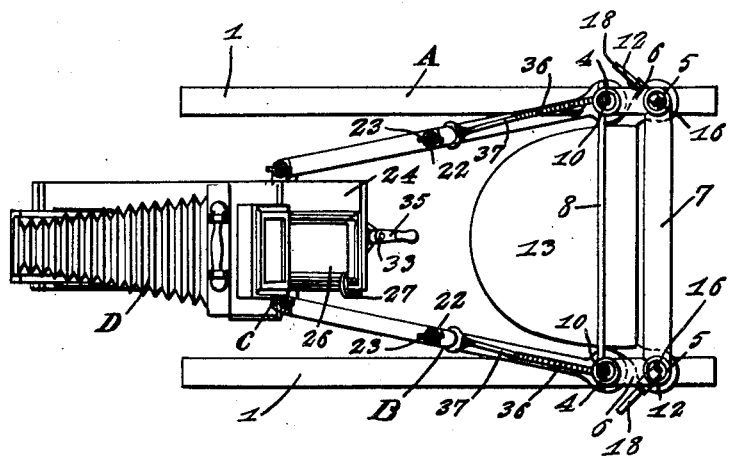
Figure 3 is a top plan view.
Figure 4:
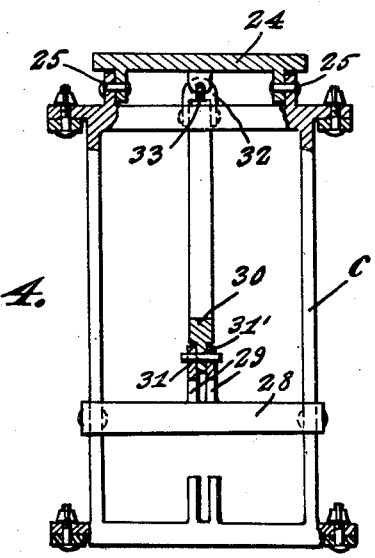
Figure 4 is a section on line 4—4 of Figure 1.
Figure 8:
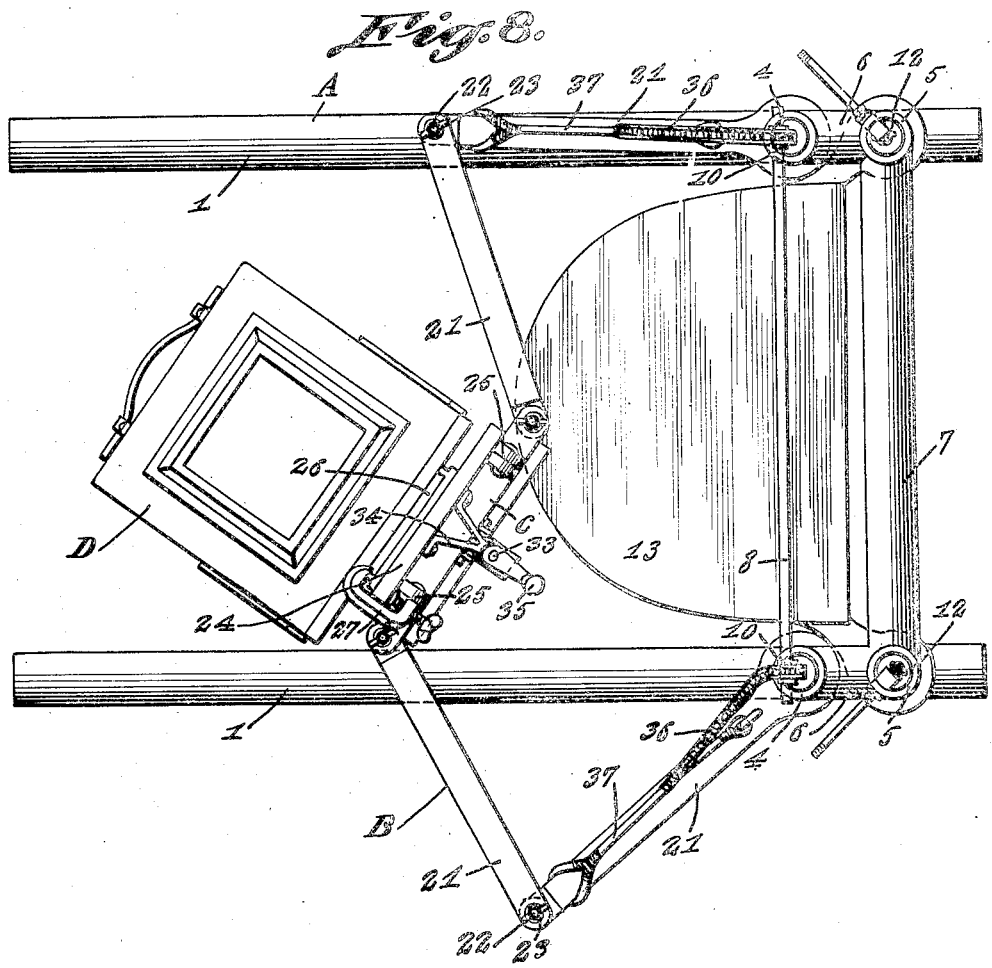
Figure 8 is a top plan view showing the parts in a different position from that shown in Figure 3.
Figure 9:
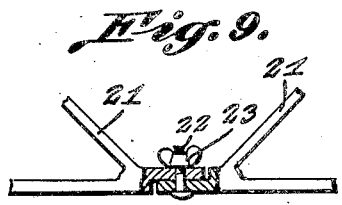
Figure 9 is a detail view showing the joint between two sections of one of the supporting arms.

The supporting means can also be adjusted to set the camera in any picture taking position. For instance, Figure 1 shows the camera set in a diagonal position to take a picture of an object in front of the stand. Figure 2 shows the camera in a vertical position to take a picture of objects placed on a table X and Figure 8 shows how the camera can be set in a vertical position to take a picture of objects regardless of their position on the table or ground glass.

By providing the base with the casters, the entire device can be readily moved to any part of the studio.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A stand of the character described comprising spaced parallel tubular uprights, hinged pairs of frame-like members slidably engaged with the uprights, the hinged members being laterally movable with respect to each other in reverse directions, a center frame-like member vertically pivoted to the first named members at the outermost ends thereof, a support pivoted for vertical swinging movement near one end thereof to the uppermost end of the center member, weights slidably fitted within the uprights, flexible connections between the weights and said first named members and having two point engagement with each of said members, and means for adjusting the support and carried by the center member.

In testimony whereof I affix my signature.

LUTHER JUDSON HIGGINBOTHAM.